United States Patent Office 3,508,633
Patented Apr. 28, 1970

3,508,633
PLASTICALLY DEFORMABLE IMPACT ABSORB-
ING MEANS FOR VEHICLES
Yoshihiro Nishimura and Akihiko Fujiki, Yokohama,
Japan, assignors to Nissan Jidosha Kabushiki Kaisha,
Yokohama, Japan
Filed Feb. 16, 1968, Ser. No. 705,969
Claims priority, application Japan, May 17, 1967,
42/41,010, 42/42,011; May 25, 1967, 42/43,461
Int. Cl. B62d 1/18; F16d 63/00
U.S. Cl. 188—1                                    12 Claims

ABSTRACT OF THE DISCLOSURE

Plastically deformable impact absorbing means for vehicle comprising axially deformable corrugated tubular member and inserted guide member to prevent flexing of the corrugated tubular member so that desired axial plastic deformation can be performed. And further, by providing easily deformable projections, static friction stage of the impact absorbing stroke is compensated to attain substantially flat compressive resistance.

---

The present invention relates to safety device for vehicles, and more particularly, to plastically deformable impact absorbing means to protect from damage or injury of vehicle personnel.

In case of collision of a vehicle to an obstacle, there might be a great danger to the vehicle personnel by the impact force causing the vehicle operator to be thrown forwardly against the steering wheel and also causing the other personnel against the vehicle portions. It is desirable to provide impact absorbing means to the steering assembly and/or to vehicle body portion or portions such as between bumper and chassis of the vehicle, preferably by means of plastically deformable impact absorbing means as a safety device so as to eliminate or at least mitigate such danger.

Accordingly, a primary object of the invention is to provide plastically deformable impact absorbing means for a vehicle to absorb impact energy by positive plastic deformation in case of collision or the like, thereby serving as a safety device for vehicle personnel.

A bellows or corrugated tubular member can be utilized as a plastically deformable impact absorbing means. The member includes many advantages that it can be manufactured easily, reliable and long impact absorbing stroke can be easily obtained and also the member can be accommodated to variable purposes such as to steering assembly or between bumper and chassis of vehicles. However, as an axial impact force is applied to the bellows or corrugated tubular member, the member easily tends to flex outward from the longitudinal axis, thus the impact absorbing characteristics will be ineffective; because of such easily flexing property, when the member is utilized as impact absorbing means between bumper and chassis of the vehicle, to jack up the vehicle by applying the jack under the bumper must be prohibited.

Accordingly, another object of the present invention is to provide plastically deformable impact absorbing means of bellows or corrugated tubular member having means to prevent from flexing thereof.

A still further object of the invention is to provide simple and reliable impact absorbing means having relatively long effective stroke.

A further object of the invention is to provide a steering assembly including above mentioned impact absorbing means to absorb impact energy applied to the steering wheel portion caused by the vehicle operator's body.

A still further object of the invention is to provide bumper means for vehicles including above mentioned impact absorbing means to absorb impact energy applied to the vehicle so as to protect the vehicle personnel from injury.

According to general features of the invention, plastically deformable impact absorbing means for vehicle comprising a bellows or corrugated tubular member forming axially spaced projections and having substantially flat cylindrical end portions, a cylindrical member being inserted in said tubular member, and said cylindrical member being secured at one end to said one end portion of the tubular member and being slidably engaged at the other end to the other end portion of the tubular member so as to prevent from flexing of the tubular member while impact absorbing operation.

The inner cylindrical member may be directly engaged to the other end portion of the outer corrugated tubular member. However, when the corrugated portion is relatively long so as to provide a long effective impact absorbing stroke, the engaging end portion must have corresponding length. To avoid such a disadvantage, according to preferable embodiments of the invention, the other end of the tubular member is also inserted by and secured to a second cylindrical member which is slidably engaged to first mentioned cylindrical member.

At the first stage of the impact absorbing stroke a static frictional force is also applied to the end portion of the apparatus, for example to the steering wheel when the impact absorbing means is included in a steering assembly of a vehicle. Such static frictional force is combined to with the impact absorbing axial resistance of the corrugated member so that the resultant initial resistance of the steering wheel can be too much to effectively absorb impact caused by the operator's body.

To avoid such disadvantages according to further features of the present invention, at least one projection of the corrugated tubular member is formed to be easily deformed compared to the other projections. Thus the combined initial resistance applied will be substantially reduced so that substantially constant resistance through impact absorbing stroke is obtained.

Further and more specific objects, features and advantages of the present invention and the manner in which the invention is carried into practice are made apparent in the following detailed description of preferred embodiments, by way of example, wherein reference is made to the accompanying drawings, in which.

Figure 1:
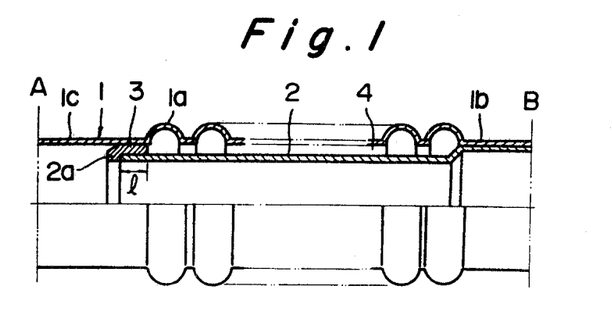
FIG. 1 shows a partially sectioned longitudinal view of one embodiment of a plastically deformable impact absorbing means according to the invention.

Referring to the drawings, more particularly to FIG. 1, 1 designates a bellows or corrugated tubular member having axially spaced continuous projections 1a, and substantially flat cylindrical end portions 1b and 1c. The outer diameter of the projections is larger than that of the end portions. A cylindrical member forming as a guide tube 2 is inserted in the corrugated tubular member 1 and secured to one end 1b of the member 1 by suitable means such as spot welding. The guide tube 2 extends through the projections 1a forming some clearance 4 between the outer wall of the tube 2 and the inner-most surface of the projections 1a, to the other end portion 1c, and the inner surface of the portion 1c is axially slidably engaged with the end portion of the guide tube 2 through a retainer ring 3 secured to said end of the guide tube 2.

The projections 1a can be manufactured as any desired form, but a corrugated tube having the projections projected all the way from original tube portion 1b and 1c is preferable, because the tube is easily manufactured and the guide tube 2 also can be easily manufactured without necessitate excessive slender portion to accommodate inner projected portions of the projections.

The retainer 3 is formed as a cylindrical ring having inside flange to facilitate fitting to the outer end of the guide tube 2. The retainer 3 is made of resilient material such as plastics or rubber covered by a sheet of low frictional coefficient such as Teflon, so that the guide tube can be easily accommodated in the corrugated tubular member without any noise in ordinary operation of the vehicle. However, the retainer 3 can be omitted as shown in FIG. 3, in which a guide tube 5 having projected end portion 5a is engaged directly with the inner surface of the end portion 1c forming a desired narrow clearance between the engaged surfaces.

The corrugated tubular member may provide longitudinal slits to the projections 1a to reduce axial compressive resistance.

Figure 4:
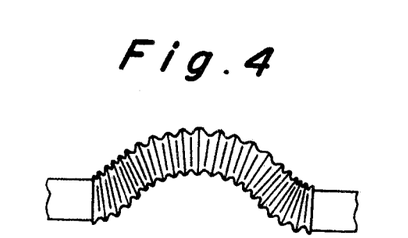
FIG. 4 shows diagrammatically flexing of a conventional impact absorbing member without an inner member.

When an axial compressive force is applied to the both ends of impact absorbing means, known corrugated tubular members without any guide tube means tend to flex as shown in FIG. 4 by bending moment caused by buckling of the corrugated portion so that the impact absorbing characteristics are greatly impaired. The impact absorbing means according to the invention does not cause such disadvantage as the both end portions 1b and 1c are aligned by the guide tube 2 and rather small clearance 4 between the inner surface of the projections 1a and the outer surface of the guide tube 2 sufficiently prevent from such flexing of the central projected portions 1a so that the corrugated tubular member collapses as shown in FIG. 2 absorbing applied compressive force or impact energy by plastic deformation of the projections 1a.

Figure 3:
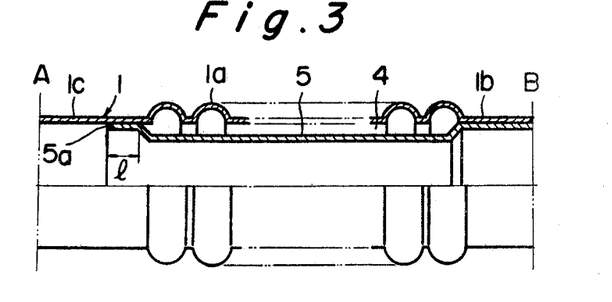
FIG. 3 shows another embodiment of the impact absorbing means shown in FIG. 1.

To support bending moment applied to the impact absorbing means, the engagement length $l$ shown in FIGS. 1 and 3 is preferably selected long enough, however, the length $l$ must be selected so as to prevent collision of the guide tube 2 while the impact absorbing stroke to the other structural member such as bearing means of the steering assembly, the face thereof is diagrammatically shown as line A in the drawings.

Figure 2:
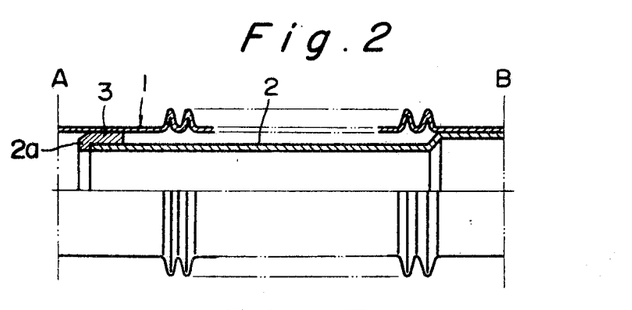
FIG. 2 shows collapsed state of the impact absorbing means shown in FIG. 1.
Figure 5:
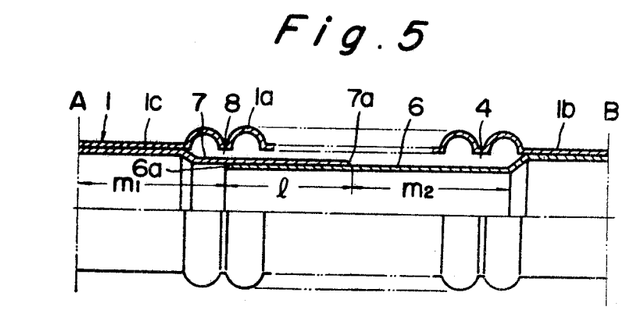
FIG. 5 shows a partially sectioned longitudinal view of a third embodiment of an impact absorbing means provided with a second inner member.

The impact absorbing means as shown in FIGS. 1 through 3 must provide rather long end portion 1c corresponding to the desired impact absorbing stroke. To eliminate such disadvantage, a second guide tube can be secured to the end portion 1c to engage the first guide tube. FIG. 5 shows such embodiment according to the invention and the impact absorbing means also include a bellows or corrugated tubular member 1 having longitudinally spaced projections 1a and flat end portions 1b and 1c. A guide tube 6 is inserted in and secured to the end portion 1b by suitable means such as spot welding and extends longitudinally in the corrugated portion 1a. A second guide tube 7 is also inserted in and secured to the end portion 1c by suitable means such as spot welding and extends longitudinally to the corrugated portion 1a in the opposite direction to the first guide tube 6.

Figure 6:
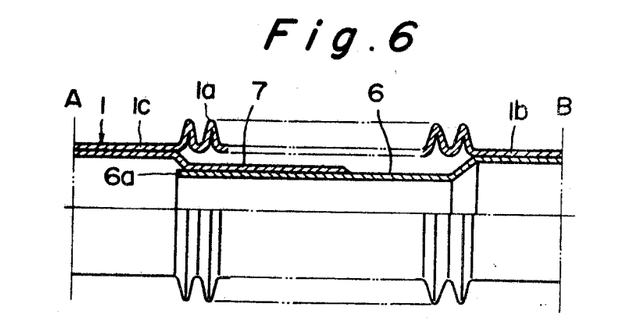
FIG. 6 shows the collapsed state of the impact absorbing means shown in FIG. 5.

The outer surface of the second guide tube 7 forms some clearance 8 between the inner surface of the projections 1a and the inner surface of the tube 7 engages axially slidably with the outer surface of the reduced portion of the guide tube 6. The length $l$ of the engagement is preferably selected as long to prevent from flexing by bending moment which is applied while absorbing impact energy. But the length $l$ is limited because the length $m_1$ which is the distance between the edge 6a of the first guide tube 6 and the obstruction line A and the length $m_2$ which is the distance between the edge 7a of the second guide tube 7 and the shoulder portion of the first guide tube 6 must be longer than impact absorbing stroke. FIG. 6 shows the collapsed state of the impact absorbing means shown in FIG. 5.

Figure 7:
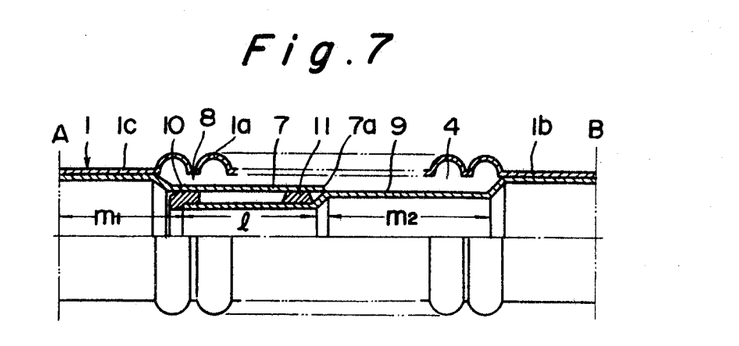
FIG. 7 shows a fourth embodiment of the impact absorbing means which is modified from the means shown in FIG. 5.
Figure 8:
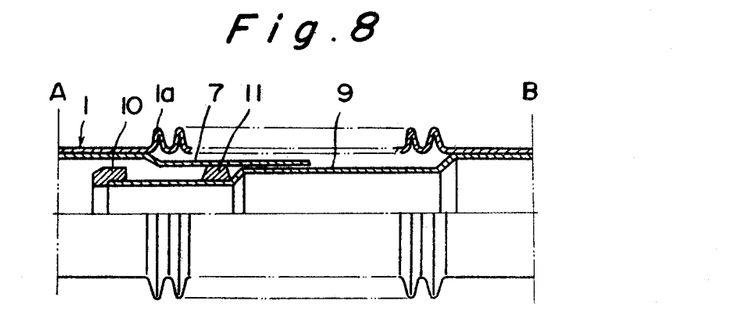
FIG. 8 shows the collapsed state of the means shown in FIG. 7.

The impact absorbing means shown in FIG. 5 also may include one or more retainer rings to provide close fitting between the first and the second guide tubes. The impact absorbing means shown in FIG. 7 provides a first guide tube 9 having second reduced portion to accommodate retainer rings 10 and 11 between the second guide tube 7. The retainer rings 10 and 11 are made of elastic material such as plastics or rubber covered by a sheet of low frictional coefficient such as Teflon. FIG. 8 shows collapsed state of the impace absorbing means shown in FIG. 7. When an impact energy or axial compressive force is applied to the both ends of the impact absorbing means shown in FIGS. 5 and 7, the first and the second guide tube will slide relatively between the inner surface of the second guide tube 7 and the outer surface of the first guide tube 6 or the retainer rings 10 and 11 fitted on the outer surface of the second reduced portion of the first guide tube 9. The corrugated portion 1a is aligned by the both end portion 1b and 1c and the rather small clearance 4 and 8 between the first and the second guide tube 6 or 9 and 7, so that the flexing of the central corrugated portion 1a is effectively prevented as shown in FIGS. 6 and 8, so that predetermined impact absorbing stroke is performed.

Figure 9:
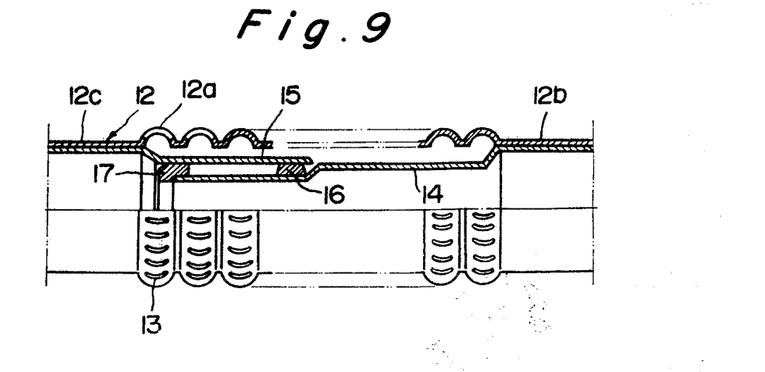
FIG. 9 shows a fifth embodiment providing longitudinal slits to corrugated projections.

FIG. 9 shows another embodiment of impact absorbing means, in which a corrugated tubular member 12 providing peripherally spaced longitudinal slits 13 disposed to each corrugated portion 12a is used as impact absorbing member in place of plain corrugated tubular member 1 as shown in FIGS. 1 through 8. The guide means shown in FIG. 9 is constructed similar to that of shown in FIG. 7 and provides double guide tubes 14 and 15 which are secured to the inside surface of the end flat portions 12b and 12c respectively, and retainer rings 16 and 17 fitted on the outer surface of the second reduced portion of the first guide tube 14. However, the corrugated tubular member 12 can be adapted to be constructed as any embodiments shown in FIGS. 1, 3, 5 and 7.

The impact absorbing means shown in FIG. 9 can be manufactured from any sheet metal having desired rigidity to the flat portions 12b and 12c, and can be manufactured to accommodate any impact absorbing characteristics by providing slits 13 of desired length and number, so that the impact absorbing means shown in FIG. 9 are particularly suitably adapted to absorb relatively small impact force such as impact force caused by human body in case of collision of the vehicle.

Figure 10:
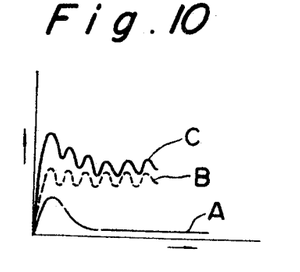
FIG. 10 shows a load-stroke diagram of impact absorbing means.

As the impact absorbing stroke is proceeding the total resistance to the impact receiving parts of the vehicle, for example the steering wheel when the impact absorbing means is included in the steering assembly to absorb impact energy caused by the operator's body in case of collision or the like, is a combined force of plastically deforming resistance of the corrugated portion of the impact absorbing means and frictional resistances caused by relatively sliding parts which are assembled to the end portion 1b or 1c of the impact absorbing means including the guide tubes. At the first stage of the impact absorbing stroke, such frictional resistances act as static friction, and when the impact energy to be absorbed is relatively small value, as aforementioned impact energy caused by human body, the static friction plays important role which can not be neglected easily. FIG. 10 shows load-stroke diagram in such a case, where A shows frictional resistance which acts as static friction of high value at the first stage then reduces to much lower value of dynamic friction; B shows resistance of the plastically deforming corrugated tube which fluctuate between substantially equal maximum and minimum values; C shows combined resistance to such as the steering wheel and the force is very high at the first stage of the stroke.

As clearly shown in FIG. 10 combined resistance or load C to such as the steering wheel at the first or initial stage of the impact absorbing stroke is very high value in spite of the substantially flat value of the curve B and act as adverse effect to the human body particularly if the impact energy is comparatively high and the stroke is performed within rather short period of time.

Figure 11:
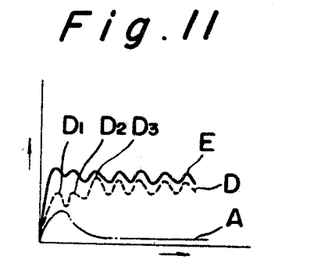
FIG. 11 shows a load-stroke diagram of impact absorbing means shown in FIGS. 12 and 14.

To avoid such disadvantage, according to the invention, at least one projection of the corrugated tubular member is formed to be easily deformed by applied axial force compared to the other projections. FIG. 11 shows such modified load-stroke diagram in which; D shows resistance of modified plastically deformable impact absorbing means including two easily deformable projections; and E shows combined resistance to such as the steering wheel. As shown in FIG. 11, as the easily deformable projections $D_1$ and $D_2$ initially collapse so that the combined resistance E is substantially flat all through the impact absorbing stroke, thus the above mentioned disadvantage is eliminated and the operator's body will be protected from injury.

Figure 12:
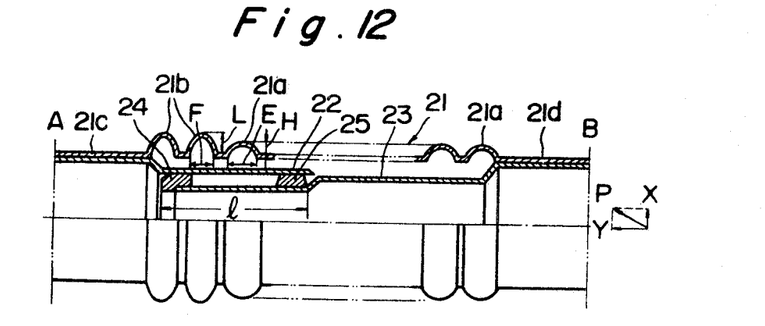
FIG. 12 shows a partially sectioned longitudinal view of impact absorbing means according to the invention providing easily deformable projections.

FIG. 12 shows an impact absorbing means providing above mentioned easily deformable projections comprising a bellows or corrugated tubular member 21 having projections 21a and 21b and end portions 21c and 21d, a first guide tube 23 having a first and a second reduced portion, a second guide tube 22 providing inner surface to engage retainer rings 24 and 25 secured on the outside surface of the second reduced portion of the first guide tube 23. The embodiment shown is the same as the impact absorbing means shown in FIG. 7 except the easily deformable projections 21b, but the projections 21b may be provided to any other impart absorbing means, to reduce combined resistance at the first or initial stage of the impact absorbing stroke. Projections 21b in this case, is formed to provide high height (L) to width (F) ratio compare to height (H) to width (E) ratio of other projections 21a so that desired easily deformable characteristics is obtained. The projections 21b is located at the left end of the projections 21a, but the location is not limited to that illustrated, and may be chosen to anywhere between end portions 21c and 21d. Also the number of the projections is not limited to two as shown in FIG. 12 as one preferred embodiment.

Figure 13:
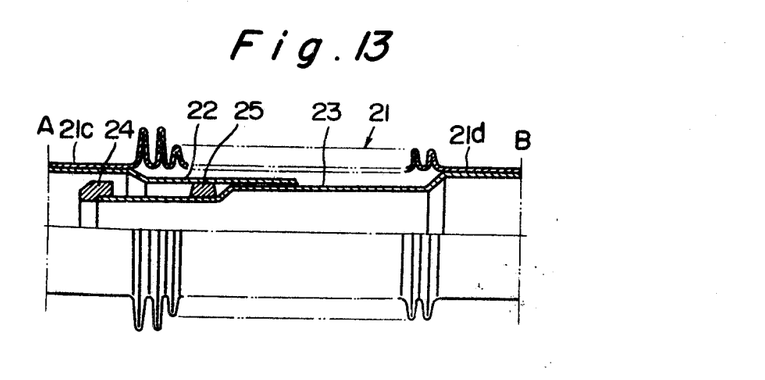
FIG. 13 shows the collapsed state of the impact absorbing means shown in FIG. 11.

When an impact force P is applied to the impact absorbing means shown in FIG. 12, a component X which is perpendicular to the longitudinal axis is supported by the engaged surfaces between the guide tubes 23 and 24 causing a degree of surface pressure. The corrugated tubular member 21 displaces axially between the end portions 21c and 21d by the axial component Y of the force P. At the first of the impact absorbing stroke, the frictional force between the guide tubes 23 and 24 and the other frictional force caused by displacement of the assembled parts to the end portion 21c and/or 21d act to the steering wheel (for example) as shown A in FIG. 11. However, at the same time the projections 21b collapse by predetermined reduced force as shown $D_1$ and $D_2$ of the curve D in FIG. 11, the combined resistance applied to the steering assembly is substantially reduced at the first stage of the impact absorbing stroke, as shown curve E in FIG. 11, compared to curve C in FIG. 10. As the projections 21a collapse by higher resistance as shown $D_3$ in FIG. 11 compensating the reduction of frictional resistance, combined resistance E will be substantially flat, limiting the maximum load to desired value. FIG. 13 shows the collapsed state of the impact absorbing means shown in FIG. 12.

Figure 14:
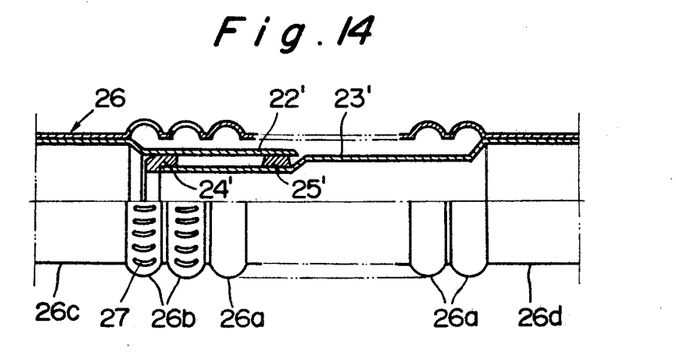
FIG. 14 shows another embodiment of the impact absorbing means providing easily deformable projections.

FIG. 14 shows another embodiment of impact absorbing means providing easily deformable projections. In this case, all the projections or corrugated portions 26a and 26b of a corrugated tubular member 26 are manufactured to have same thickness and construction such as the corrugated tubular member 1 shown in aforementioned figures. However, the corrugated portions 26b, shown as two in this embodiment, provide peripherally spaced longitudinal slits 27 to the projected portions respectively, so that impact absorbing characteristics of the portions 26b are reduced to a desired value compared to portions 26a. The other construction of the impact absorbing means shown in FIG. 14 is same as to the impact absorbing means shown in FIG. 12, for the sake of clarity, providing two guide tubes 22' and 23' each secured to inside surface of flat end portions 26c and 26d respectively, and two retainer rings 24' and 25' secured on the outside surface of the second reduced portion of the first guide tube 23'. However, also in this case, it will be understood that the inner guide means may be constructed as any suitable construction such as shown in FIGS. 1, 3 or 5.

The impact absorbing means shown in FIG. 14 include advantages such that the corrugated tubular member can be manufactured very easily because all the projections 26a and 26b have same size and thickness; and also, the easily deformable portions 26b can be easily manufactured by simple machining process, and the deforming characteristics thereof can be easily adapted to desired value by varying the number and depth of the slits 27.

In operation, when an impact force is applied to the impact absorbing means shown in FIG. 14, the corrugated portions 26b providing slits 27 deform plastically by predetermined reduced force as shown $D_1$ and $D_2$ in FIG. 11 thus compensate the static frictional force caused by relatively sliding members at the first stage of the impact absorbing process. Subsequently, the corrugated portions 26a deform successively, absorbing applied impact force.

Another embodiment of the impact absorbing means providing easily deformable projections (not shown) is constructed as the impact absorbing means shown in FIG. 9 providing peripherally spaced longitudinal slits 13 to all the projections. By increasing the number and/or depth of the slits disposed to desired projection or projections compared to other projections, the first mentioned projection or projections will have desired reduced impact absorbing characteristics. Thus, the impact absorbing means also have desired impact absorbing characteristics as shown curve D in FIG. 11.

Figure 15:
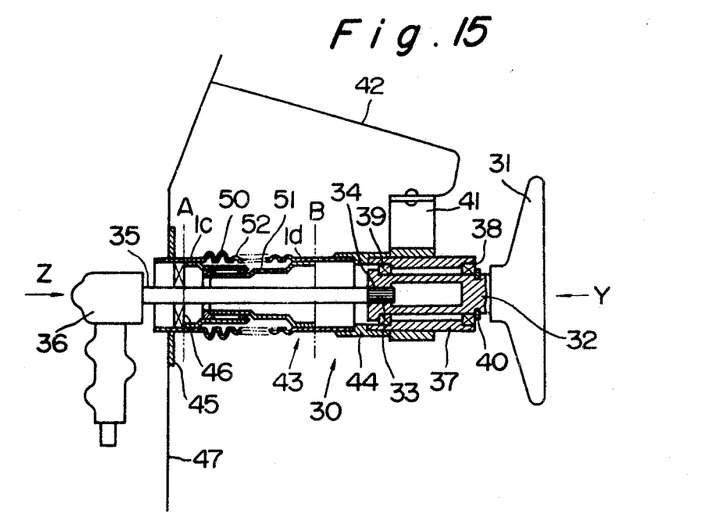
FIG. 15 shows diagrammatically a longitudinal sectional view of a steering assembly providing impact absorbing means according to the invention.

FIG. 15 shows an exemplified application of the plastically deformable impact absorbing means shown in FIGS.

1 through 13 which is mounted to a steering assembly 30 of a vehicle for absorbing impact energy caused by human body, in case of collision or the like of the vehicle causing the operator's body to be thrown forwardly to a steering wheel 31.

The steering wheel 31 is secured to an upper steering column shaft 32 having an inside serrated portion 33 which is axially slidably engaging to an outer serrated portion 34 of a lower steering column shaft 35 which is connected to steering gear means in a steering gear box 36 secured to a vehicle body portion following conventional practice.

The upper steering column shaft 32 is rotatably supported by an upper jacket tube 37 through bearings 38 and 39 and a retainer 40. The upper jacket tube 37 is supported and aligned by upper clamp means 41 which is secured to a relatively rigid support bracket 42 which in turn secured to a relatively rigid vehicle portion. The support between the upper jacket tube 37 and the upper clamp means 41 permits axial displacement of the upper jacket tube 37 to the leftward or downward direction and may include bushing means to facilitate the displacement.

A lower jacket tube 43 includes an upper portion 44 which is secured to the upper jacket tube 37 by conventional practice such as screws (not shown) and forming a shoulder portion abutting to the upper clamp means 41 to prevent upward or rightward displacement of the upper portion of the steering assembly 30. The lower portion of the lower jacket tube 43 forms a flange 45 which is secured to the dash panel 47 of the vehicle body and provides a bearing 46 to support the lower steering column shaft 35.

Impact absorbing means 50 as shown in FIGS. 1 through 14 is secured between the upper and the lower portion of the lower jacket tube 43. Any embodiment shown in FIGS. 1, 3, 5, 7, 9, 12 and 14 can be utilized as impact absorbing means 50. The lines A and B shown in FIG. 15 represent same border lines shown in FIGS. 1 through 14.

In ordinary operation, the steering assembly controls the vehicle in the same manner as conventional steering wheel, as the steering force is transmitted from the steering wheel 31 to the lower steering column shaft 35 through the upper steering column shaft 32 and the serrated connection 33 and 34. In case of collision or the like, if the operator's body is thrown forwardly to the steering wheel 31 by the inertia force caused by the collision, the applied impact force will force the steering wheel 31 leftward or downward causing axial relative displacement between the serrated portions 33 and 34 of the upper and the lower steering column shaft 32 and 35, and also between the upper jacket tube 37 and the upper clamp means 41, both are easily displaced as described heretofore. Thus the impact force is applied to the upper end portion 44 of the lower jacket tube 43 which is secured to the dash panel 47 by the flange 45, so that the including impact absorbing means 50 deforms plastically absorbing the applied impact energy. While the deformation of the impact absorbing means 50, the radial component of the applied impact force tends to flex the impact absorbing means 50 as shown in FIG. 4 so that the effectiveness of impact absorbing is greatly impaired. However, the impact absorbing means 50, according to the invention, includes guide means such as 51 and 52 maintaining alignment of the corruguated portions 1a, so that the corrugated portions collapse as desired manner and the abovementioned disadvantage is eliminated.

Furthermore, when the steering wheel 31 displaces leftward, the frictional resistance between the moving elements, such as between the outer surface of the upper jacket tube 37 and the inner surface of the upper clamp means 41 and between the guide means 51 and 52, act as a static frictional resistance to the steering wheel 31 at the earlier stage of such displacement. The frictional resistance can be relatively high value as shown in FIG. 10 compared to relatively weak impact absorbing means 50 designed to absorb impact energy caused by human body. Thus the steering assembly 30 preferably includes impact absorbing means shown in FIG. 12 or 14 providing easily deformable projections such as 21b shown in FIG. 12, so that the static frictional resistance at the first stage of the displacement of the upper portion of the steering assembly 30 is compensated by the weak resistance of the easily deformable projections as shown in FIG. 11, and the combined resistance applied to the steering wheel is limited to desired predetermined value.

In case of collision or the like, if the forward portion of the vehicle is destroyed causing the steering gear box 36 displacing rightward to the direction of the steering wheel 31, the serrated connection 33 and 34 easily slide relatively to project the lower steering column shaft 35 into the hollow space provided in the upper steering column shaft, so that no harmful effect occurs to the upper portion of the steering assembly. Also if the dash panel 47 displaces rightward, the impact absorbing means 50 will collapse between the flange 45 and the shoulder portion of the upper end 44 of the lower jacket tube 43 which is abutted to the left end of the upper clamp means 41 to prevent axial upward displacement of the jacket tube 37 and 43. The collapse of the impact absorbing means 50 in this case ressembles impact absorbing process abovementioned, however, the impact energy displacing the dash panel 47 will be far greater than the impact energy caused by human body, the impact absorbing means 50 does not intend to absorb such impact energy and act only as a safety device to eliminate upward displacement of the upper portion of the steering assembly 30, which can be harmful to the vehicle operator.

Figure 16:
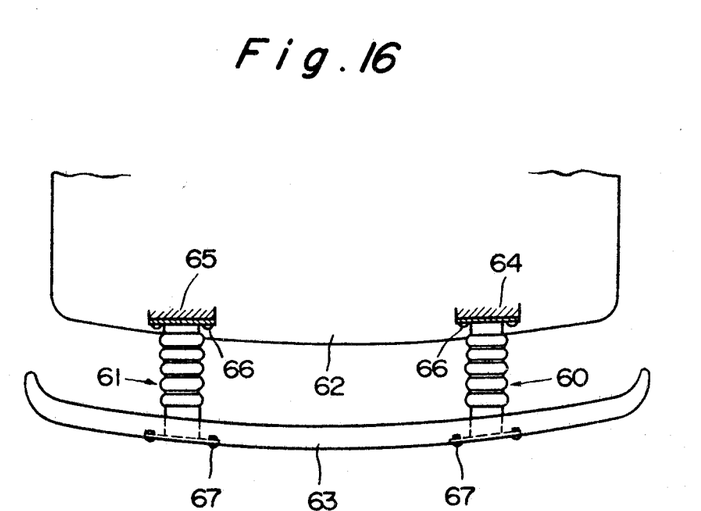
FIG. 16 shows diagrammatically a partially broken away plan view of bumper means providing impact absorbing means according to the invention.

FIG. 16 shows another embodiment of the impact absorbing means shown in FIGS. 1 through 14 utilized as bumper stay means of a vehicle to absorb impact energy applied to the vehicle in case of collision or the like.

The impact absorbing means 60 and 61 are inserted between forward and/or rear portion 62 of the vehicle and bumper means 63. The impact absorbing means 60 or 61 are more rigid than the means 50 shown in FIG. 15 and may include end flanges to secure relatively rigid vehicle portions 64 and 65 and the bumper means 63 by suitable means such as bolts 66 and 67 respectively.

In the event of occurrence such as collision or the like, if the forward or rear bumper means 43 impact with an obstacle, the impact force is transmitted to the vehicle body 62 through the impact absorbing means 60 and/or 61. The applied impact energy absorbs at least partially by plastic deformation of the impact absorbing means 60 and/or 61. The impact force can be more obliquely applied to the impact absorbing means 60, 61 compared to the abovementioned steering assembly, so that other impact absorbing means without guide tube or tubes will easily flex as shown in FIG. 4 and the effectiveness of the impact absorbing means is greatly impaired. The impact absorbing means 60 and 61, according to the invention, effectively absorb applied impact energy as the impact absorbing means 60 and 61 include guide tube or tubes to align and guide corrugated projections such as 1a.

Further advantage of the impact absorbing means shown in FIG. 16 is that, the impact absorbing means permit utilizing of jack means under the bumper to jack up the vehicle. As the guide tube or tubes are inserted together preventing lateral displacement of the impact absorbing means irrespective to the corrugated portions, the construction can be easily adapted to stand the lateral force to jack up the vehicle.

What is claimed is:

1. Plastically deformable impact absorbing means for vehicles comprising a bellows or corrugated tubular member having substantially flat end portions and a plurality of spaced plastically deformable projections projected between said end portions; a cylindrical guide member being inserted in said tubular member; and said guide member having one end portion fitting to and being secured with one of said flat end portions of the tubular member, a middle portion of smaller diameter than said end portion and underlying said projections to provide a clearance between the innermost surfaces of said projections and outer surface of said middle portion, the other end portion being slidably engaged with the inner surface of said other flat end portion of the tubular member, said other end portion having sufficient stroke to prevent abutting adjacent structural members during the impact absorbing process, whereby said flat end portions of the tubular member are aligned by said guide member to prevent flexing of said tubular member when the tubular member is deformed plastically by an axially applied impact force.

2. Impact absorbing means as claimed in claim 1 characterized in that said corrugated tubular member provides peripherally spaced longitudinal slits to said projections.

3. Impact absorbing means claimed in claim 1, further comprising at least one retainer ring being secured to the outer surface of said slidably engaging end portion of said guide member, said retainer ring comprising an annular ring of resilient material and having a sheet made of material of low frictional coefficient covering said annular ring.

4. Plastically deformable impact absorbing means for vehicles comprising a bellows or corrugated tubular member having substantially flat end portions and a plurality of spaced projections projected between said end portions; a first and a second tubular guide member inserted in said tubular member; said first guide member having one end portion fitting to and being secured with one of said flat end portions of the tubular member, a middle portion of less diameter than said end portion and underlying said projections to provide clearance between innermost surfaces of said projections and outer surface of said middle portion, and the other end portion adapted to be slidably engaging with the second guide member; said second guide member having one end portion fitting to and being secured with the other of said flat end portions of the tubular member, and the other end portion slidably engaging with said other end portion of said first guide member whereby said flat end portions of the tubular member are aligned by said first and second guide members so as to prevent flexing of the tubular member when the tubular member is deformed plastically by axially applied impact force.

5. Impact absorbing means as claimed in claim 4, characterized in that said corrugated tubular member provides peripherally spaced longitudinal slits to said projections.

6. Impact absorbing means claimed in claim 4, further comprising at least one retainer ring being secured to the outer surface of said slidably engaging end portion of one of said guide members, said ring being located between the outer surface of said slidably engaging end portion of one of said guide members and in sliding contact with the inner surface of said slidably engaging end portion of the other said guide member, said retainer ring comprising an annular ring of resilient material and having a sheet made of material of low frictional coefficient covering said annular ring.

7. Plastically deformable impact absorbing means for vehicles comprising a bellows or corrugated tubular member consisting of substantially flat end portions and a plurality of spaced plastically deformable projections projected between said end portions; at least one said projection being formed to be more easily deformable compared to the other projections to compensate for static friction between relatively axially sliding parts at the initial stage of the impact absorbing stroke; a cylindrical guide member being inserted in said tubular member; said guide member having one end portion fitting to and being secured with one of said flat end portions of the tubular member, a middle portion of less diameter than said end portion and underlying said projections to provide clearance between innermost surfaces of said projections and outer surface of said middle portion, and the other end portion being slidably engaged with the inner surface of said other flat end portion of the tubular member, whereby said flat end portions of the tubular member are aligned by the guide member so as to prevent flexing of the tubular member and substantially equal resistant load through the impact absorbing stroke is obtained when the tubular member is deformed plastically by axially applied impact force.

8. Impact absorbing means as claimed in claim 7, characterized in that said at least one easily deformable projection is formed as having larger height to width ratio compared to that of other projections.

9. Impact absorbing means as claimed in claim 7, characterized in that said at least one easily deformable projection is formed by providing peripherally spaced longitudinal slits in the projected portion.

10. Impact absorbing means as claimed in claim 7, characterized in that all the projections of said corrugated tubular member are provided peripherally spaced longitudinal slits, and said at least one easily deformable projection is provided with an increased number and/or depth of said slits.

11. A steering assembly for absorbing impact force caused by a human body comprising
(a) an upper steering assembly slidably supported by a supporting means secured to the vehicle body, said upper steering assembly comprising,
  a steering wheel,
  an upper steering column shaft securing the steering wheel, and
  an upper jacket tube rotatably supporting said upper steering column shaft and being slidably supported by said supporting means of a vehicle;
(b) a lower steering column shaft axially slidably engaged with said upper steering column shaft; and
(c) a lower jacket tube removably secured to the upper jacket tube at the upper end and to a lower vehicle body portion at the lower end, said lower jacket tube comprising,
  a shoulder means formed by or secured to the upper end and abutting against said supporting means secured to the vehicle body to prevent upward displacement of said upper steering assembly, and an impact absorbing means forming at least a middle portion of the lower jacket tube and providing a bellows or corrugated tubular member having substantially flat end portions and a plurality of spaced plastically deformable projections projected between said end portions; a cylindrical guide member being inserted in said tubular member; said guide member having one end portion fitting to and being secured with one of said flat end portions of the tubular member, a middle portion of less diameter than said end portion and underlying said projections to provide a clearance between the innermost surfaces of said projections and the other surface of said middle portion, the other end portion being slidably engaged with the inner surface of said other flat end portion of the tubular member, said other end portion having sufficient stroke to prevent abutting to said lower vehicle body portion during the impact absorbing process, whereby said flat end portions of the tubular member are aligned by the guide member so as to prevent flexing of the tubular member when the tubular member is deformed plastically by axially applied impact force.

12. A steering assembly for absorbing impact force caused by a human body comprising
(a) an upper steering assembly being slidably supported by a supporting means secured to the vehicle body, said upper steering assembly comprising,
a steering wheel,
an upper steering column shaft securing the steering wheel, and
an upper jacket tube rotatably supporting said upper steering column shaft and being slidably supported by said supporting means of a vehicle;
(b) a lower steering column shaft axially slidably engaged with said upper steering column shaft; and
(c) a lower jacket tube removably secured to the upper jacket tube at the upper end and to a lower vehicle body portion at the lower end, said lower jacket tube comprising,
a shoulder means formed by or secured to the upper end and abutting against said supporting means secured to the vehicle body to prevent upward displacement of said upper steering assembly, and, an impact absorbing means providing a bellows or corrugated tubular member having substantially flat end portions and a plurality of spaced projections projected between said end portions, at least one said projection being formed to be more easily deformable compared to the other projections to compensate for static friction between relatively axially slidable parts at the initial stage of the impact absorbing stroke whereby a substantially uniform resultant load through the impact absorbing stroke is obtained.

References Cited

UNITED STATES PATENTS

| | | | |
|---|---|---|---|
| 3,369,634 | 2/1968 | Mazelsky | 188—1 |
| 3,373,629 | 3/1968 | Wight et al. | 188—1 X |
| 3,373,630 | 3/1968 | Heurtebise | 188—1 X |
| 3,394,612 | 7/1968 | Bogosoff et al. | 188—1 X |
| 3,401,576 | 9/1968 | Eckels | 74—493 |
| 3,412,628 | 11/1968 | De Gain | 188—1 X |
| 3,428,150 | 2/1969 | Muspratt | 188—1 |

DUANE A. REGER, Primary Examiner

U.S. Cl. X.R.

74—493; 280—87; 293—70